United States Patent [19]

Eugster

[11] Patent Number: 4,460,819
[45] Date of Patent: Jul. 17, 1984

[54] INSTANTANEOUS FLOW-THROUGH ELECTRIC WATER HEATER FOR COFFEE MAKERS

[75] Inventor: Arthur Eugster, Romanshorn, Switzerland

[73] Assignee: Intropa Trading S.A., Panama

[21] Appl. No.: 457,194

[22] Filed: Jan. 11, 1983

[51] Int. Cl.³ .................. A47J 31/44; F24H 1/12; H05B 3/20
[52] U.S. Cl. .................. 219/302; 99/288; 99/300; 99/307; 219/283; 219/301
[58] Field of Search ............ 219/301, 302, 296, 297, 219/283; 99/279, 281–283, 285, 288, 300, 302

[56] References Cited

U.S. PATENT DOCUMENTS 4,095,086  6/1978  Ohnmacht et al. ........... 219/302 X
4,271,349  6/1981  Hamon ........................ 99/288 X
4,331,067  5/1982  Mysicka et al. ............... 99/285

FOREIGN PATENT DOCUMENTS 1269259  5/1968  Fed. Rep. of Germany ...... 219/302
2316539  10/1973 Fed. Rep. of Germany ...... 99/279
2316254  11/1973 Fed. Rep. of Germany ...... 99/300
2551779  5/1977  Fed. Rep. of Germany ...... 219/301
2757109  6/1979  Fed. Rep. of Germany ...... 219/301

Primary Examiner—A. Bartis
Attorney, Agent, or Firm—Darby & Darby

[57] ABSTRACT

A flow-through instantaneous electric water heater for coffee percolators has a metal casting with a substantially flat bottom portion formed with a U-shaped trough receiving therein a U-shaped electric heating element. A semi-annular boiling water chamber is formed in the casting between the arms of the U-shaped heating element adjacent the base region of the U and has an inlet and an outlet opening connected, respectively, to water inflow and outflow conduits located adjacent the legs of the heating element. The water inflow conduit has a length at least 1.3 times the length of the average flow path of water flowing through the boiling water chamber or about twice the diameter of the boiling water chamber and is thermally insulated over a major portion of its length from the adjacent heating element leg by an air gap to insure that the temperature of the fresh water flowing into the chamber from the inlet conduit is below the boiling temperature. The thickness of the casting increases toward the base of the U at an inclination angle between 1.5° and 4°.

10 Claims, 4 Drawing Figures

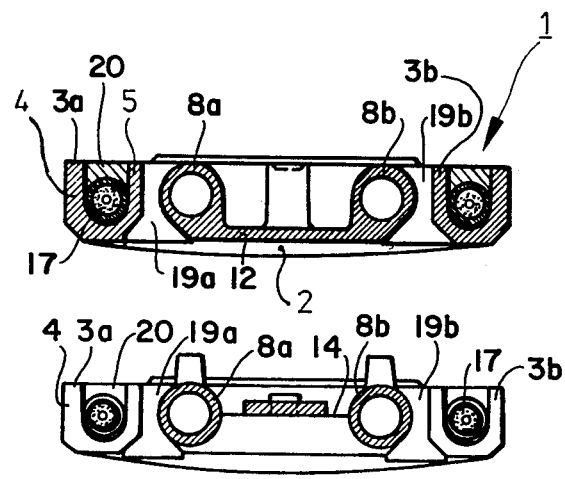
Fig. 3
Fig. 2
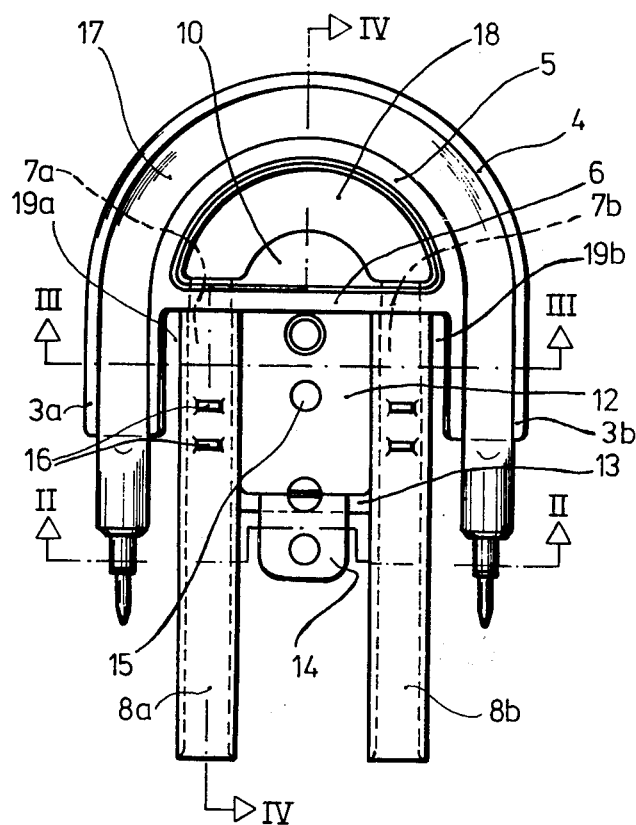
Fig. 1
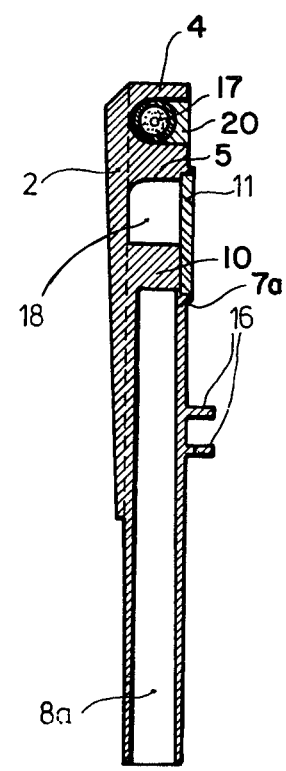
Fig. 4

INSTANTANEOUS FLOW-THROUGH ELECTRIC WATER HEATER FOR COFFEE MAKERS

The invention relates to an instantaneous water heater for coffee makers and to a coffee maker with such an instantaneous heater.

Modern, electrically heated coffee makers usually make use of a horseshoe-shaped heater to which a metal pipe, carrying the water to be heated, is attached as snugly as possible. Normally, this instantaneous water heater is arranged below a cold-water container of the coffee maker and is connected by a hose with the cold-water container. A brewing-water guide, whose outlet is above the highest level of the water in the cold water container and which pours the brewing water into a container with coffee powder, is connected to the brewing-water connection of the instantaneous water heater.

There is a check valve in the connecting hose between the cold-water container and the water inlet of the instantaneous water heater. This check valve permits the unimpeded flow of fresh water, but blocks any backflow of hot water as soon as a counterpressure on the valve develops due to the upwards expulsion of brewing water by the steam that is generated. This counterpressure ceases, at the latest, when all the brewing water has been expelled from the instantaneous water heater, at which time the valve opens up once again and permits new fresh water to flow into the pipe next to the heater and, once again, to be brought to a boil and expelled as brewing water.

Apart from the somewhat unpleasant development of noise, reminiscent of snoring, known instantaneous water heaters have the significant disadvantage that, due to the discontinuous mode of operation and due to the high temperature increase at the end of the expulsion cycle, which is associated with the discontinuous mode, they calcify very rapidly. Then they initially generate much steam with increased emission of noise, but soon are no longer capable of functioning.

In its coffee maker HD 5141, which is on the market, Philips AG uses an instantaneous water heater, which has a lesser tendency to calcify than previously known types. This results from the water-brewing part being constructed, not as a stretched-out pipe, but as a brewing chamber, from only part of the water is expelled during a cycle. The remaining brewing water, which is at the brewing temperature, mixes with the new fresh water flowing in. Admittedly, this mixing of residual brewing water with fresh water flowing in makes the process more continuous and therefore leads to less development of noise and to less furring. There is, however, no guarantee that the improvements effected by this known instantaneous water heater can be maintained over a prolonged period of operation.

It is an object of the present invention to provide an instantaneous water heater of the above type, which emits less noise and forms less steam. A decrease in steam generation is particularly important because the generation of steam leads to early calcification of the water-conducting part. Once calcification has set in and, in formation, has reduced heat transfer, evolution of steam and, therefore further calcification increase rapidly, as a result of which the machine rapidly becomes unusable.

In the aforementioned instantaneous water heater of Philips AG, the water flowing in commences to boil gently as early as in the water inlet channel, especially when the fresh water container is nearly empty. As a result, steam is generated in this water inlet channel and the valve, which prevents the further addition of water, is closed prematurely. Consequently, the brewing water chamber is not filled completely with water, and the small amount of water present is rapidly heated to boiling temperature and expelled completely or nlmost completely by the steam generated also in the water inlet channel. The desired effect of retaining as large an imount of residual water as possible in the brewing-water chamber, which can mix with the fresh water flowing in, is therefore not adequately fulfilled. In spite of the existence of the brewing-water chamber, this known instantaneous water heater nevertheless tends to become calcified relatively severely.

In contrast, provisions have been made in the present invention to ensure that the water flowing in the water inlet channel remains below the boiling temperature even at the walls of the chamber. The boiling process takes place exclusively in the brewing-water chamber. Inasmuch as no steam is formed in the water inlet channel, a relatively large amount of residual water remains in the brewing water chamber, where it mixes rapidly with the fresh water, which is still in the water inlet channel and possibly has been heated slightly. The water reaches the boiling temperature rapidly once again, because the minimum temperature of the water in the brewing-water chamber is relatively high due to the high amount of residual water. Consequently, the cycling time is greatly reduced and the total process, although it still is intermittent, can hardly be differentiated from a continuous process. As a result, noise emission and calcification are greatly reduced.

In a preferred embodiment, thermal resistance between the heater and the water-inlet channel is developed by an air gap. As a result, the water supply pipe of the water inlet channel has contact with the hot parts only at its fore-part, which has only a small area, so that there is adequate assurance that the walls of the water-inlet channel will not be heated above the boiling temperature.

Preferably, the metal water-conducting pipe of the water-inlet channel is made relatively long. The relatively high heat capacity of this long pipe and of the fresh water in the pipe result in the inflowing fresh water being heated only slowly and, in no case, as far as the boiling point.

In the preferred embodiment, the symmetrical construction of the total instantaneous water heater permits the water inlet to be connected to either the inlet or outlet pipe of the heater. It is therefore not necessary to produce different instantaneous water heaters for different types of machines. A possible, slight calcification in the brewing-water chamber is appreciably counteracted even further by providing rounded walls in the brewing chamber.

When installing the present instantaneous water heater in a coffee maker, it has proven to be very advantageous to tilt the instantaneous water heater so that the brewing chamber is higher than the water conducting pipes. By so doing, the water in the water-inlet channel does not flow into the brewing-water chamber during the entire brewing water expulsion process, but only at a defined time, at which the pressure, acting on the valve, has fallen to zero. However, the water is then available in a sufficient amount for mixing with the residual brewing water in the brewing-water chamber.

The invention is explained in greater detail below by means of a presently preferred but, nonetheless, illustrative embodiment as shown in the drawing, wherein:

FIG. 1 is a plan view of an instantaneous water heater embodying the present invention; with the lid over the brewing water chamber removed.

FIG. 2 is a sectional view taken along contour II—II in FIG. 1;

FIG. 3 is a sectional view taken along line III—III in FIG. 1; and

FIG. 4 is a sectional view taken along contour IV—IV in FIG. 1.

Referring to the drawing, there is shown a water heater embodying the present invention. It has a cast metal piece 1 with a semicircular bottom member 2 having two extensions 3a and 3b which are symmetrical about the center line and complete the semicircle to a U-shape. Along the outer edge of the bottom member 2, there is a vertically projecting edge flange 4, and, parallel to it, an inner flange 5. Between the arms of the U of the inner flange 5 and the boundary of the semicircular bottom member 2, there is a bridging flange 6, which has openings 7a and 7b in those regions where the bridging flange is adjacent to the arms of the U of the inner flange 5.

Water conducting pipes 8a and 8b are connected to the openings 7a and 7b. A preformed part 10, having a boundary constructed so as to be approximately concentric with the semicircular part of the inner flange 5, protrudes between openings 7a and 7b into the region limited by the bridging flange 6 and the inner flange 5. A lid 11 (see FIG. 4) is pressed on or glued on to this semicircular part of the inner flange 5, the bridging flange 6 and the preformed part 10. The water-conducting pipes 8a and 8b are connected in the inner region by crossbars 12, 13 and 14 in which individual attachment openings 15 are formed. Holding flanges 16 are constructed on the water-conducting pipes 8a and 8b in order to hold an overload protection switch. In the space between the outer boundary flange 4 and the inner flange 5, and overlain by member 20 (FIGS. 3 and 4), there is a U-shaped heater 17, which is either pressed in or glued in.

As can readily be seen in FIG. 4, the thickness of the bottom part 2 increases towards the base of the U. As a result of this increasing thickness of the bottom, which forms an angle of between 1.5° and 4°, and preferably 2°, the water-conducting pipes 8a and 8b and the brewing-water chamber 18 below lid 11, when the surface of bottom part 2 is level, have a slight tilt, the function of which will be explained further below. All boundaries of the brewing-water chamber 18 are clearly rounded, as can be seen best in FIG. 4, in order to counteract possible furring in these regions.

Between the water-inlet channel, formed by the water delivery pipe 8a, and the part of the heater 17 adjacent to pipe 8a, there is an air gap 19a, which extends up to the bridging flange 6 and functions as heat insulation between the water-inlet channel and the heater 17. There is also a similar air gap 19b between the water outlet channel, formed by the water outlet pipe 8b, and the part of the heater 17 adjacent to pipe 8b, although such an air gap would not be required there. Because of this symmetrical construction, connections can be made interchangeably to the water-inlet and outlet pipes.

In operation, the water conducting pipe 8a, shown at the left in FIG. 1, for instance, forms the water delivery pipe, which is connected with a fresh-water container by a hose connection containing a valve. The water conducing pipe 8b on the right then represents the outlet pipe for the brewing water. The water is brought to a boil in brewing chamber 18 and expelled by the generated steam through water outlet pipe 8b. Since only the walls of the brewing-water chamber 18 are in close, heat-conducting contact with heater 17, whereas the water supply pipe 8a is not, and since there is sufficient cold cooling water in the relatively long water supply pipe 8a, no steam is formed in the water supply pipe 8a, so that no lime is deposited therein. The fact that the temperature of the water in the water delivery pipe 8a is below the boiling point moreover ensures that a sufficient amount of residual water remains in the brewing-water chamber 18 (which otherwise would be expelled by steam forming in the water delivery pipe) so that, at the end of the cycle, an adequate amount of residual brewing water can mix with fresh water or moderately heated fresh water flowing in rapidly from the water delivery pipe 8a, which is still completely filled.

The tilted arrangement of the water delivery pipe 8a ensures that the water in the pipe 8a flows into the brewing-water chamber 18 only at the end of a cycle when the valve opens up and then, since it is available in an adequate amount, mixes with the residual water in the brewing-water chamber 18. This rapid mixing of fresh water with residual brewing water in the brewing-water chamber ensures that practically no lime is deposited in the brewing-water chamber 18. Furring is counteracted also by the rounded edges of the brewing-water chamber 18 and by the preformed part 10, which protrudes into the brewing-water chamber 18, since a largely irrotational flow of the water is achieved by this shaping.

If the heat insulation of the air gap 19a is insufficient, the air gap 19a can of course be replaced by a thermal resistance mode, for example, of a plastic material. In a particular case, it may even happen that the heat insulation by the continuous air gap is too great, so that consideration could be given to decreasing the thermal resistance somewhat, for example, by a connecting web.

In the example of the operation shown, the water delivery pipe 8a clearly protrudes beyond the end of heater 17. In this example, the total length of the water delivery pipe 8a is about 1.3 times the average length of the path which the water must take through the brewing-water chamber 18, or about twice the diameter of the brewing-water chamber 18. As already explained above, this relatively long length of the water delivery pipe 8a favors the desired continuous and only moderate heating of the fresh water running in.

As already mentioned above, the functions of the attachment openings 15 and the holding flange 16 are to hold a temperature control switch for the hot plate of the coffee maker and an overload protection switch, which should be mounted on the water delivery pipe 8a.

Although a preferred form of the invention has been disclosed for illustrative purposes, those skilled in the art will appreciate that many additions, modifications and substitutions are possible, without departing from the scope and spirit of the invention, as defined in the accompanying claims.

What is claimed is:

1. A flow-through heater for coffee percolators, consisting of a metal casting having a substantially flat bottom portion the border portions of which are formed with a receiving trough of U-shaped cross-section for receiving therein a substantially U-shaped electric heater element, and a boiling water chamber formed adjacent the foot of the U-shape of the heater element, water inflow and outflow conduits located adjacent the U-legs of said heater element opening into said boiling water chamber, said water inflow conduit being provided with heat insulation over the major portion of its length against the adjacent end of the heater element, characterized that said water inflow conduit is of a length amounting to at least 1.3 times the length of the average flow path of the water flowing through said boiling water chamber.

2. A flow-through heater according to claim 1, characterized in that it is of symmetric configuration with respect to its center line.

3. A flow-through heater according to claim 1 or 2, characterized in that the interior of said boiling water chamber is formed as a semi-annular flow channel.

4. A flow-through heater according to claim 1, characterized in that the edges formed by adjoining walls of said boiling water chamber are rounded.

5. A flow-through heater according to claim 1, characterized in that said boiling water chamber is provided with a substantially flat lid.

6. A flow-through heater according to claim 1, characterized in that it is formed with increasing bottom wall thickness towards the foot of said U-shape.

7. A flow-through heater according to claim 6, characterized in that the bottom wall thickness increases at an inclination angle between 1.5° and 4°.

8. A flow-through heater according to claim 7, wherein said inclination angle is 2°.

9. A flow-through heater according to claim 1, comprising an air gap for providing said heat insulation over the major portion of the length of said water inflow conduit.

10. A flow-through heater according to claim 1, wherein the length of said water inflow conduit is twice the diameter of said boiling water chamber.

* * * * *